US012698878B2

(12) United States Patent
Hüster et al.

(10) Patent No.: US 12,698,878 B2
(45) Date of Patent: Aug. 4, 2026

(54) HEADLAMP FOR A VEHICLE

(71) Applicant: Hella GmbH & Co. KGaA, Lippstadt (DE)

(72) Inventors: Christian Hüster, Salzkotten (DE); Boris Kubitza, Möhnesee-Körbecke (DE); Martin Plümpe, Paderborn (DE); Udo Venker, Güterlsoh (DE); Carsten Wilks, Lippsradt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 104 days.

(21) Appl. No.: 18/410,480

(22) Filed: Jan. 11, 2024

(65) Prior Publication Data

US 2024/0151381 A1 May 9, 2024

Related U.S. Application Data

(63) Continuation of application No. PCT/EP2022/069239, filed on Jul. 11, 2022.

(30) Foreign Application Priority Data

Jul. 12, 2021 (DE) ......................... 102021117875.4

(51) Int. Cl.

| | |
|---|---|
| ***F21S 41/64*** | (2018.01) |
| ***F21S 41/153*** | (2018.01) |
| ***F21S 41/16*** | (2018.01) |
| ***F21W 102/135*** | (2018.01) |
| ***F21Y 105/10*** | (2016.01) |
| ***F21Y 115/10*** | (2016.01) |
| ***F21Y 115/30*** | (2016.01) |

(52) U.S. Cl.
CPC ........... *F21S 41/645* (2018.01); *F21S 41/153* (2018.01); *F21S 41/16* (2018.01); *F21W 2102/135* (2018.01); *F21Y 2105/10* (2016.08); *F21Y 2115/10* (2016.08); *F21Y 2115/30* (2016.08)

(58) Field of Classification Search
None
See application file for complete search history.

(56) References Cited

U.S. PATENT DOCUMENTS 5,390,087 A * 2/1995 Daumueller ......... B60Q 1/0686 362/462
6,587,573 B1 * 7/2003 Stam ...................... B60Q 1/143 382/104

(Continued)

FOREIGN PATENT DOCUMENTS

DE 102012200048 A1 7/2013
DE 102014204614 A1 9/2015

(Continued)

*Primary Examiner* — Srinivas Sathiraju
(74) *Attorney, Agent, or Firm* — Husch Blackwell LLP

(57) ABSTRACT

A headlamp for a vehicle is provided, and includes at least one light source and an optical element for generating a high beam light distribution and a low beam light distribution in front of the vehicle. The headlamp is designed to generate a high beam light distribution that contains at least one illuminated region, and at least one glare suppression region that is not lit. The headlamp is also designed to also generate a low beam light distribution that contains at least one illuminated region, and at least glare one suppression region that is not lit.

9 Claims, 4 Drawing Sheets

(56) References Cited

U.S. PATENT DOCUMENTS 7,722,236 B2 * 5/2010 Naganawa ............ F21S 41/155 362/543
7,825,600 B2 * 11/2010 Stam ...................... B60Q 1/143 382/104
10,518,695 B2 * 12/2019 Taudt .................... F21S 41/125
10,982,833 B2 * 4/2021 Iwasaki ................... F21S 45/47
11,465,553 B2 * 10/2022 Mochizuki ............. B60Q 1/085
11,619,360 B2 * 4/2023 Potter ................... F21S 41/321 362/543
11,726,184 B2 * 8/2023 Ferreira ................ G01S 17/894 356/4.01
11,772,545 B2 * 10/2023 Levi ........................ G01S 17/18 362/466
11,872,929 B2 * 1/2024 Martin ................... B60Q 1/085
11,899,201 B2 * 2/2024 Inoue ..................... B60K 35/23
12,061,335 B2 * 8/2024 Hamada ............. G02B 27/0101
2003/0185017 A1 * 10/2003 Ishida ................... F21S 41/162 362/539
2004/0027836 A1 * 2/2004 Takada .................. F21S 41/172 362/346
2004/0105275 A1 * 6/2004 Sazuka ................. F21S 41/143 362/545
2005/0219858 A1 * 10/2005 Yamamura ............ F21S 41/173 362/539
2006/0056192 A1 * 3/2006 Yagi ...................... F21S 41/334 362/512
2010/0033984 A1 * 2/2010 Sugimoto ............... F21S 41/43 362/538
2010/0195908 A1 * 8/2010 Bechtel .................. H04N 5/213 382/167
2013/0286672 A1 * 10/2013 Godecker ............ G01M 11/068 362/466
2014/0098551 A1 * 4/2014 Krauss ..................... B60Q 1/12 362/465
2015/0210205 A1 * 7/2015 Naber ...................... B60Q 1/04 315/82
2017/0064175 A1 * 3/2017 Furutake .................. G02B 3/02
2017/0158113 A1 * 6/2017 Kanayama ............ F21S 41/255
2017/0276980 A1 * 9/2017 Kauschke ............. F21S 41/335
2017/0299138 A1 * 10/2017 Zawacki .............. B60Q 1/0041
2018/0105095 A1 * 4/2018 Taudt ...................... F21S 41/32
2018/0128442 A1 * 5/2018 Suwa ................... B60Q 1/1423
2018/0275278 A1 * 9/2018 Yamada ................. G01C 3/085
2018/0347781 A1 * 12/2018 Potter ..................... F21S 41/18
2019/0120457 A1 * 4/2019 Alisafaee .............. F21S 41/143
2020/0101888 A1 * 4/2020 Taudt .................... F21S 41/125
2020/0156530 A1 * 5/2020 Kubitza ............... G06V 10/141
2020/0198524 A1 * 6/2020 Kubitza ................... B60Q 1/08
2020/0248884 A1 * 8/2020 Iwasaki ................... F21S 41/36
2020/0284883 A1 * 9/2020 Ferreira ................ G01S 7/4815
2021/0215319 A1 * 7/2021 Raring .................. H01S 5/0225
2021/0347294 A1 * 11/2021 Mochizuki ............. G08G 1/166
2022/0034471 A1 * 2/2022 Herold .................. F21S 41/663
2022/0128210 A1 * 4/2022 Huester ................. F21S 41/663
2022/0146818 A1 * 5/2022 Inoue ................... H04N 9/3144
2022/0197025 A1 * 6/2022 Hamada ............... G02B 5/0278
2022/0299185 A1 * 9/2022 Goncalves ............ F21S 41/635
2023/0068957 A1 * 3/2023 Hüster ................... B60Q 1/143
2023/0095603 A1 * 3/2023 Fedosik ................ F21S 41/153 362/545
2023/0107281 A1 * 4/2023 Levi ....................... B60Q 1/143 362/466
2023/0119988 A1 * 4/2023 Huester .................... B60Q 1/04 340/435
2023/0160553 A1 * 5/2023 Zhang ................... F21S 41/255 362/509
2023/0341103 A1 * 10/2023 Huester .................. B60Q 1/085
2024/0123896 A1 * 4/2024 Kubitza ................. B60Q 1/143
2024/0131981 A1 * 4/2024 Huester .................... B60Q 1/12
2024/0151381 A1 * 5/2024 Hüster .................. F21S 41/153
2024/0337361 A1 * 10/2024 Knobloch ............... F21S 41/25
2024/0384848 A1 * 11/2024 Buechner .............. F21S 41/663
2024/0426446 A1 * 12/2024 Büchner ............... F21S 41/663

FOREIGN PATENT DOCUMENTS

DE 102015225105 A1 6/2017
DE 102019218776 A1 6/2020
DE 102019116800 A1 12/2020
DE 112019003916 T5 6/2021
DE 202016008993 U1 6/2021
EP 2772682 A2 9/2014
EP 3267097 A1 1/2018
WO 2020257606 A1 12/2020

* cited by examiner

HEADLAMP FOR A VEHICLE

CROSS REFERENCE

This application claims priority to PCT Application No. PCT/EP2022/069239, filed Jul. 11, 2022, which itself claims priority to German Application No. 10 2021 117875.4, filed Jul. 12, 2021, the entireties of both of which are hereby incorporated by reference.

FIELD OF THE INVENTION

The present invention relates to a headlamp for a vehicle.

BACKGROUND OF THE INVENTION

DE 10 2012 200 048 A1 discloses this type of headlamp. The headlamps described therein are designed to generate a high beam light distribution and a low beam light distribution in front of the vehicle. The headlamps can use a camera in the vehicle to identify traffic ahead of the vehicle or oncoming vehicles. In one of the embodiments described in DE 10 2012 200 048 A1, the headlamp can be pivoted horizontally and vertically, in order to move the high beam light distribution generated by the headlamp horizontally and vertically. As a result, a glare suppression region can be generated in a targeted manner that prevents blinding of an oncoming vehicle, for example.

The low beam light is an important component of vehicle lighting and legally required for all vehicles. It is used in particular to reliably illuminate the region directly in front of the vehicle without blinding other road users. There are special requirements regarding the luminosity and light distribution, in which the light distribution is normally asymmetrical. The low beam light also ensures that the vehicle itself can be easily seen by other road users in the dark.

FIG. 4 shows a typical asymmetrical low beam light distribution 1. The low beam light distribution 1 does not blind oncoming traffic in the other lane 2. The left-hand portion 3 of the low beam light distribution 1 directed toward the oncoming lane 2 on a straight road remains below the horizontal axis 4 at such an angle that the oncoming traffic is not blinded.

The right-hand portion 5 of the low beam light distribution 1, which is directed higher, increases the range of visibility in the lane 6 that the vehicle is travelling in, and along the shoulder 7 of the road. The horizontal light/dark boundary 8 of the light distribution is higher in the right-hand portion 5 than in the left-hand portion 3 of the light distribution. There is a transition region 9 between the left and right portions 3, 5, where the vertical angle of the light distribution changes abruptly.

It is impossible to prevent oncoming traffic from looking directly into the headlamp in actual traffic conditions when traveling through a curve, turning, or due to dynamic vertical movements of the vehicle body. Even the low beam light can be blinding in these situations. By way of example, the higher right-hand portion of the low beam light distribution enters the other lane when traveling through a curve, thus blinding oncoming traffic. The same thing happens when turning, because the higher right-hand portion and the transition region enter the other lane briefly, potentially blinding others.

The light blinding others is even brighter when the vehicle is caused to move up and down on an uneven road surface. This not only has a strong impact on the ability to distinguish contrast during the blinding moment, it also strongly reduces visual performance due to the need to adapt to the change in light directly after the blinding effect.

BRIEF SUMMARY OF THE INVENTION

The fundamental object of the present invention is to create a headlamp of the type specified above, with which blinding other road users can be reduced or prevented when using the low beam lights.

The headlamp is designed to also generate a low beam light distribution that contains at least one illuminated region and at least one glare suppression region that is not lit. This results in a reduction or prevention of the blinding effect for oncoming traffic, or other vehicles traveling in the same direction, both during dynamic vertical movements of the vehicle body and when traveling through a curve or turning.

For this, the at least one glare suppression region in the high beam light distribution and/or low beam light distribution has a vertical light/dark boundary and a horizontal light/dark boundary. In particular, the at least one glare suppression region of the high beam light distribution and/or low beam light distribution is basically rectangular.

The headlamp can be configured to retain at least one property of the at least one glare suppression region, in particular its position and/or size and/or shape when switching from the high beam light distribution to the low beam light distribution, and/or from the low beam light distribution to the high beam light distribution. Consequently, light striking leading and oncoming traffic can be dimmed within whichever light distribution is being used.

The headlamp can contain numerous lighting elements for generating the pixels in a light distribution in a targeted manner. By actuating the lighting elements in a targeted manner, a glare suppression region can be generated in the low beam light distribution and/or high beam light distribution. The headlamp in this case can be a high resolution headlamp.

The lighting elements can be light emitting diodes or laser diodes, in particular in a solid-state LED array. In this case, the at least one light source is formed by the light emitting diodes or laser diodes. The lighting elements can also be part of a digital micromirror device or an LCoS or LCD. In this case, there is at least one additional light source that can light the active surface of the digital micromirror device or the LCoS or LCD.

The headlamp can contain a control unit that is configured to use information from at least one sensor in the vehicle to determine the position and/or size and/or shape of the at least one glare suppression region. This sensor can be a camera that is configured to record the region in front of the vehicle. The images recorded by the camera can be analyzed in order to identify objects such as other vehicles that are not to be blinded. A glare suppression region is then generated for the other vehicle.

The control unit can be configured to use information form the at least one sensor in the vehicle relating to dynamic vertical movements of the vehicle body and/or travelling through a curve and/or turning. Sensor data relating to horizontal angle changes when travelling through a curve or vertical angle changes when moving vertically can also be used, for example.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. shows a first low beam light distribution generated in front of a vehicle by a headlamp according to the invention, indicated by lighter and darker regions, wherein the angles are measured in degrees along the horizontal and vertical axes.

DETAILED DESCRIPTION OF THE DRAWINGS

Figure 1:
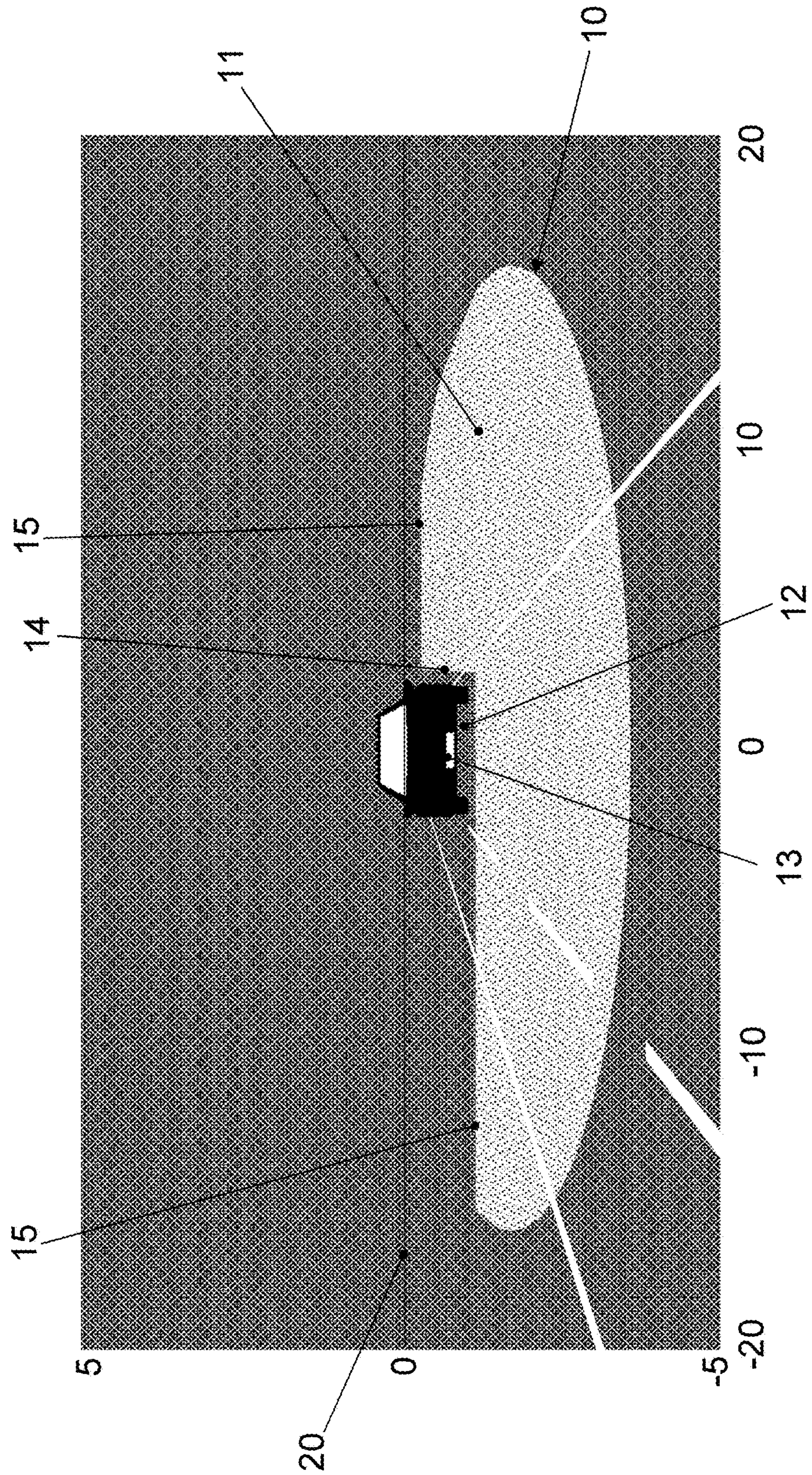

Identical and functionally identical parts and regions have the same reference symbols in the drawings.

The headlamp, not shown, has at least one light source and one optical element for generating a high beam light distribution and a low beam light distribution in front of the vehicle. The at least one light source can be a solid-state LED array containing numerous light emitting diodes (LEDs) arranged in a matrix, in which the individual light emitting diodes can be actuated individually and/or in groups in order to generate the pixels in a light distribution in a targeted manner. The optical element can be a projection lens, for example, that can project the light generated by the at least one light source toward the area in front of the vehicle.

FIG. 1 shows a low beam light distribution 10 containing an illuminated region 11 and a glare suppression region 12 that is not lit. The glare suppression region 12 is within the low beam light distribution 10, in which the transition is normally located where the vertical angle of the light distribution changes abruptly. There is a vehicle 13 in this region in the situation illustrated in FIG. 1, which is why the control unit in the headlamp generates a glare suppression region 12 there. A vertical light/dark boundary is generated to the right of the vehicle 13 when this glare suppression region is formed, where the vertical angle of the upper boundary of the illuminated region changes abruptly, or the horizontal light/dark boundary 15 is lowered abruptly. There is no vertical light/dark boundary to the left of the vehicle 13.

Figure 2:
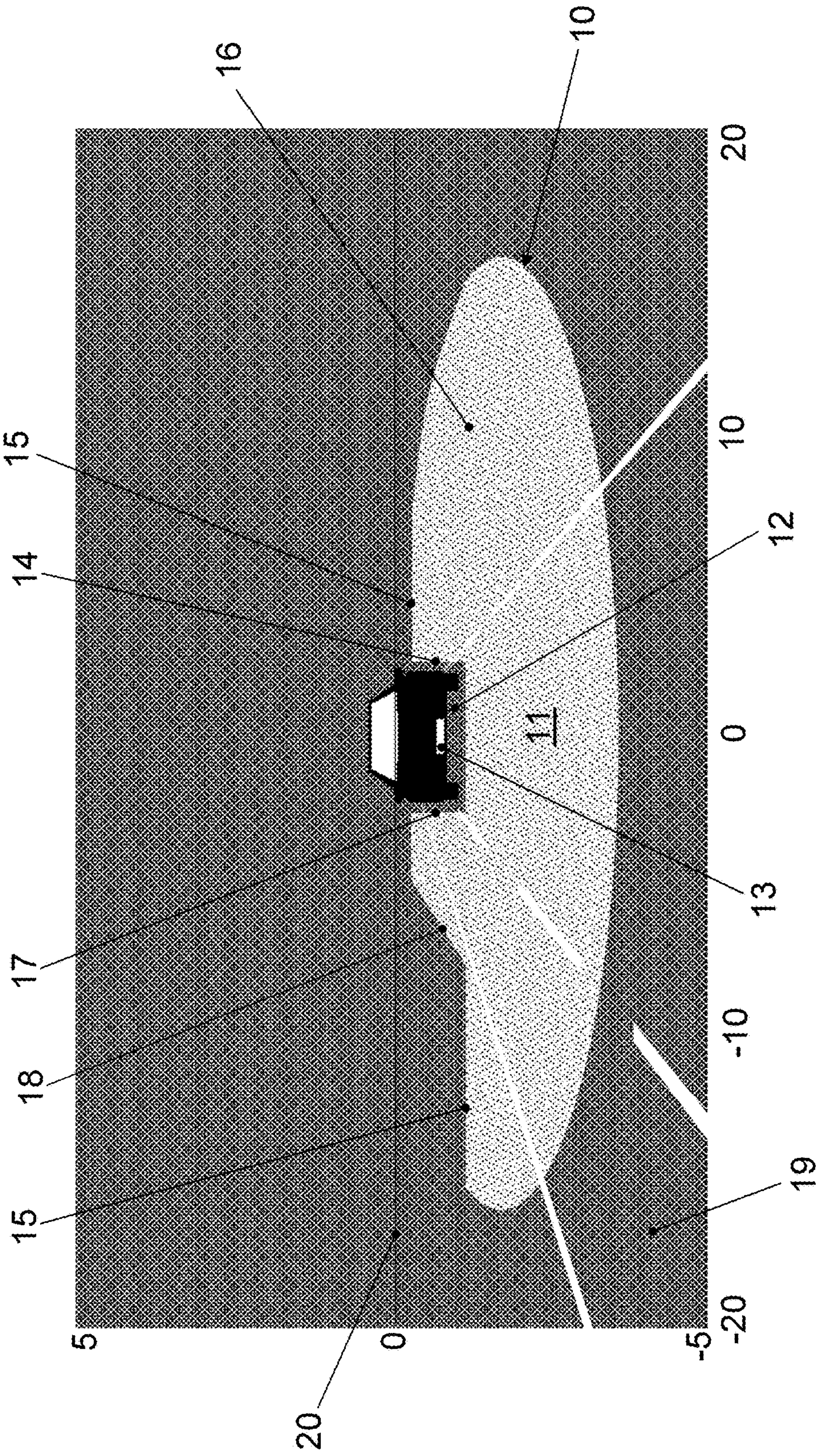
FIG. 2 shows a second low beam light distribution generated in front of a vehicle by a headlamp according to the invention, indicated by lighter and darker regions, wherein the angles are measured in degrees along the horizontal and vertical axes.

FIG. 2 also shows a low beam light distribution 10 that contains an illuminated region 11 and a glare suppression region 12 that is not lit. The low beam distribution in the situation illustrated in FIG. 2 is pivoted toward the left therein because the vehicle is travelling through a curve. The other vehicle 13 and the glare suppression region 12 surrounding it are located in the right-hand portion 16 of the low beam light distribution 10, which is typically higher. For this reason, the glare suppression region 12 in the situation shown in FIG. 2 is rectangular, with two vertical light/dark boundaries 14, 17.

Part of the right-hand portion 16 of the low beam light distribution 10 and the transition 18 are in the other lane 19. However, no oncoming traffic has been detected there, such that no further glare suppression region is generated in the low beam light distribution.

Figure 3:
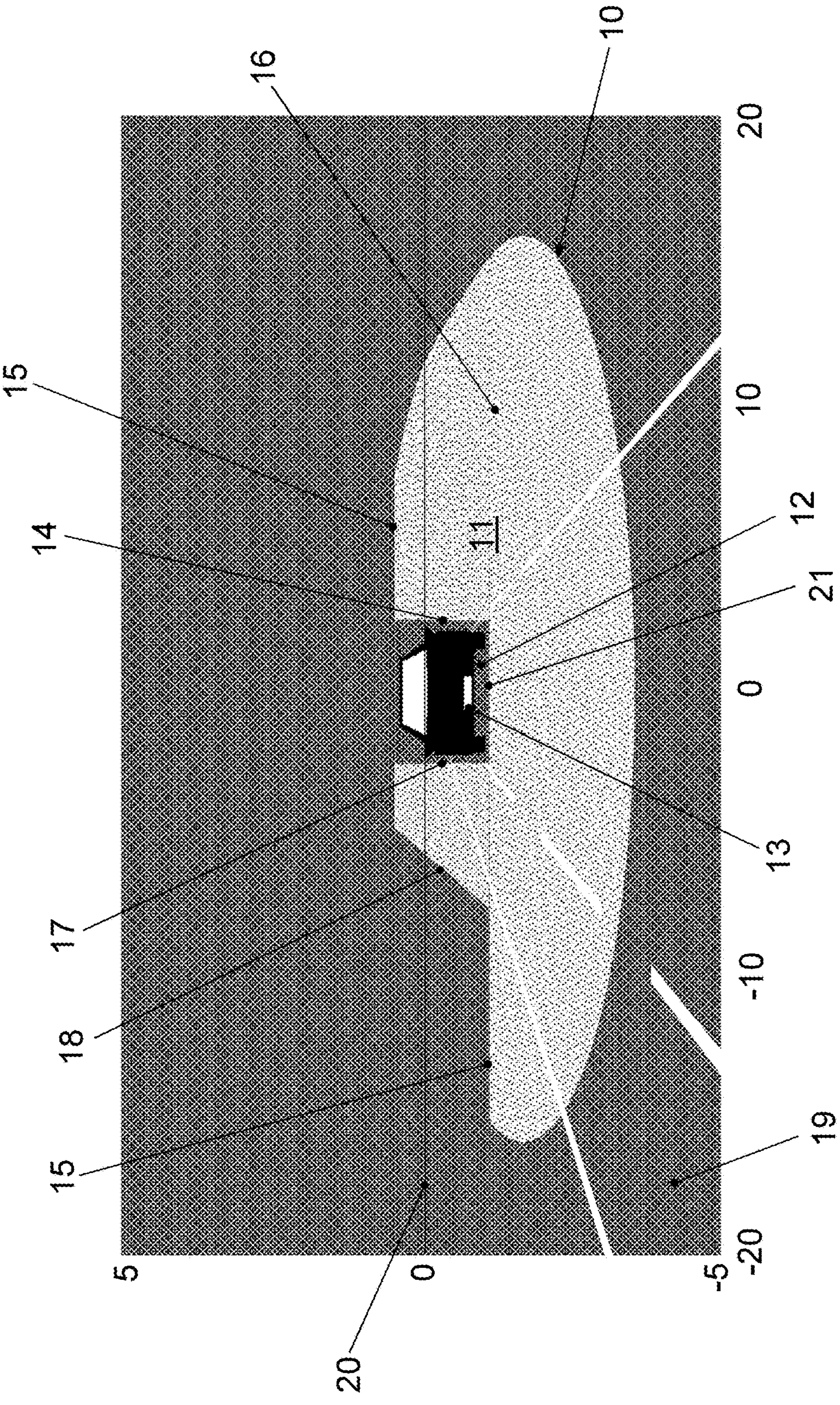
FIG. 3 shows a third low beam light distribution generated in front of a vehicle by a headlamp according to the invention, indicated by lighter and darker regions, wherein the angles are measured in degrees along the horizontal and vertical axes.
Figure 4:
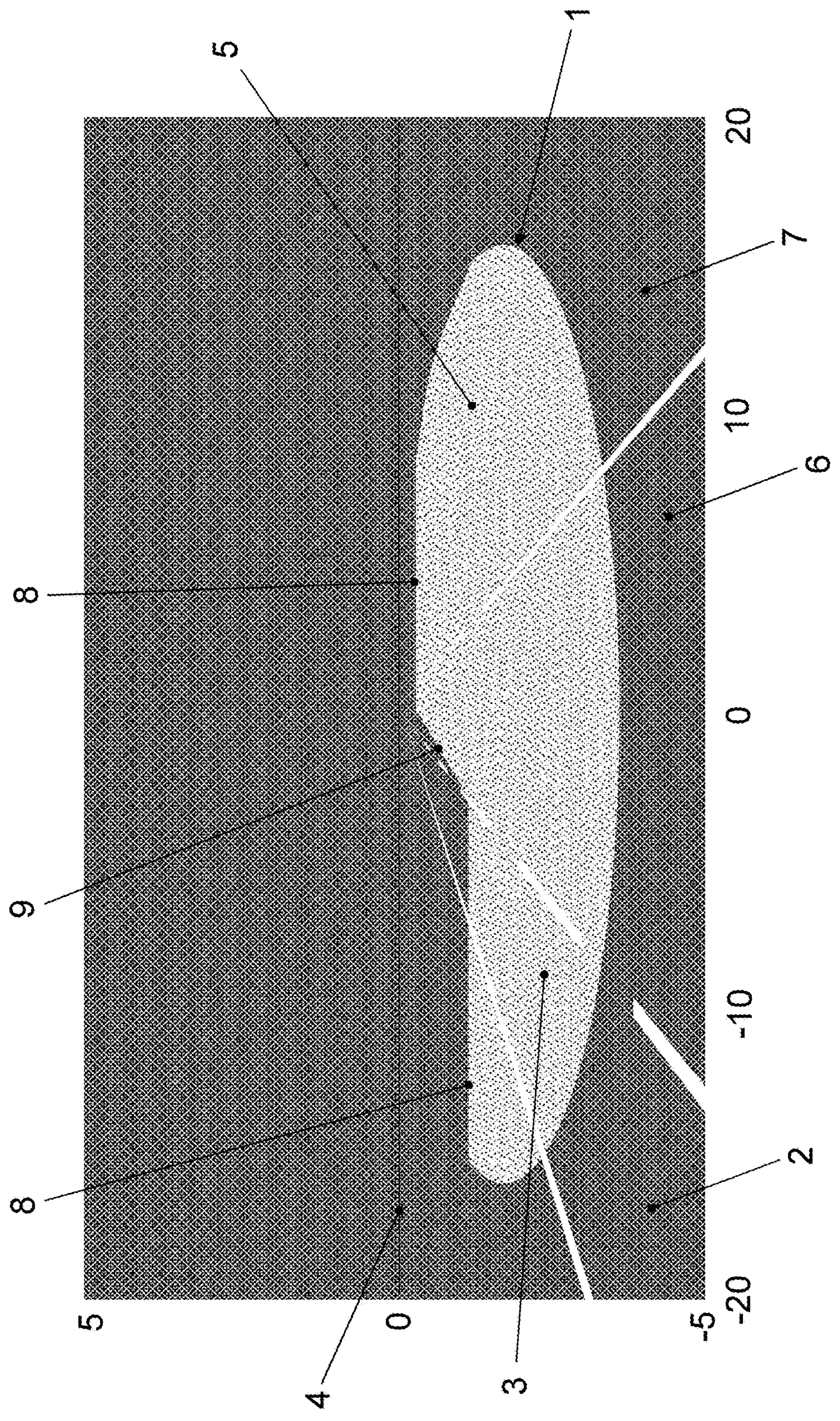
FIG. 4 shows a typical low beam light distribution according to the prior art in front of a vehicle, indicated by lighter and darker regions, wherein the angles are measured in degrees along the horizontal and vertical axes.

The low beam light distribution 10 shown in FIG. 3 substantially corresponds to that in FIG. 2. In this case, however, the low beam light distribution 10 is pivoted upward due to a vertical movement, such that the horizontal light/dark boundary 15, in particular in the low beam light distribution 10, is pivoted upward. Particularly in the right-hand portion 16 of the light distribution, the horizontal light/dark boundary 15 is above the horizontal axis 20.

The lower boundary 21 of the glare suppression region 12 is not pivoted upward therewith during the vertical movement. Instead, because the other vehicle 13 has been detected, the lower boundary 21 remains below it, such that the vertical extension of the glare suppression region 13 is greater than in the situation illustrated in FIG. 2.

There can be more than one glare suppression region in the low beam light distribution 10. By way of example, both the glare suppression region 12 in the situation shown in FIG. 1 can also be used as a glare suppression region for oncoming traffic, not shown therein.

LIST OF REFERENCE SYMBOLS

1 low beam light distribution
2 other lane (oncoming traffic)
3 left-hand portion of the low beam light distribution
4 horizontal axis
5 right-hand portion of the low beam light distribution
6 lane in which the vehicle is travelling
7 shoulder of the road
8 horizontal light/dark boundary
9 transition between the left and right portions of the light distribution
10 low beam light distribution
11 illuminated region of the low beam light distribution
12 glare suppression region of the low beam light distribution
13 leading vehicle
14 vertical light/dark boundary
15 horizontal light/dark boundary
16 right-hand portion of the low beam light distribution
17 vertical light/dark boundary
18 transition between the left and right portions of the light distribution
19 other lane (oncoming traffic)
20 horizontal axis
21 lower boundary of the glare suppression region

The invention claimed is:

1. A headlamp for a vehicle, the headlamp comprising:

at least one light source wherein the at least one light source has a solidstate light emitting diodes (LEDs) array containing numerous LEDs arranged in a matrix, in which the individual LEDs can be actuated individually and/or in groups to generate pixels in a light distribution in a targeted manner, and an optical element for generating a high beam light distribution and a low beam light distribution in front of the vehicle, wherein the headlamp generates a high beam light distribution that contains at least one illuminated region and at least one glare suppression region that is not lit, wherein the headlamp also generates a low beam light distribution that contains at least one illuminated region and at least glare one suppression region that is not lit.

2. The headlamp according to claim 1, wherein the at least one glare suppression region in the high beam light distribution and/or the low beam light distribution comprises a vertical light/dark boundary and a horizontal light/dark boundary.

3. The headlamp according to claim 1, wherein the at least one glare suppression region in the high beam light distribution and/or low beam light distribution is generally rectangular.

4. The headlamp according to claim 1, wherein the headlamp retains at least one property of the at least one glare suppression region, when switching from the high beam light distribution to the low beam light distribution or from the low beam light distribution to the high beam light distribution.

5. The headlamp according to claim 4, wherein the property retained by the headlamp is its position and/or size and/or shape.

6. The headlamp according to claim 1, wherein the lighting elements are part of a digital micromirror device or an LCOS display or LCD.

7. The headlamp according to claim 1, wherein the headlamp contains a control unit that uses information from at least one sensor in the vehicle to determine the position and/or size and/or shape of the at least one glare suppression region.

8. The headlamp according to claim 7, wherein the at least one sensor is a camera that records a region in front of the vehicle.

9. The headlamp according to claim 7, wherein the control unit uses information from the at least one sensor in the vehicle relating to dynamic vertical movement of the vehicle body and/or travel through curves and/or turning procedures.

* * * * *